United States Patent
Barry

[15] 3,651,363
[45] Mar. 21, 1972

[54] DIVALENT EUROPIUM-ACTIVATED BARIUM-MAGNESIUM PYROSILICATE

[72] Inventor: Thomas L. Barry, Beverly, Mass.
[73] Assignee: Sylvania Electric Products Inc.
[22] Filed: Dec. 23, 1968
[21] Appl. No.: 785,981

[52] U.S. Cl. ..................................313/109, 252/301.4 F
[51] Int. Cl. .........................................C09k 1/54, H01j 1/63
[58] Field of Search ...........................252/301.4 F; 313/109

[56] References Cited

UNITED STATES PATENTS

| | | | |
|---|---|---|---|
| 2,297,108 | 9/1942 | McKeag et al | 252/301.4 F |
| 2,467,810 | 4/1949 | Cassanos | 252/301.4 F |
| 3,260,675 | 7/1966 | McAllister | 252/301.4 F |
| 3,451,941 | 6/1969 | McAllister | 252/301.4 F |

OTHER PUBLICATIONS

Klasens et al. Ultraviolet Fluorescence of Some Ternary Silicates Activated with Lead, Journal of the Electrochemical Society, Vol. 104, No. 2, Feb. 1957, pp. 93– 100

*Primary Examiner*—Robert D. Edmonds
*Attorney*—Norman J. O'Malley and Owen J. Meegan

[57] ABSTRACT

Divalent europium-activated $BaMg_2Si_2O_7$ phosphors are useful in fluorescent lamps. The phosphors have spectral energy distribution curves which peak at 400 nanometers and which have a very narrow emission band.

8 Claims, 2 Drawing Figures

PATENTED MAR 21 1972    3,651,363

THOMAS L. BARRY
INVENTOR

BY Owen T. Meegan
ATTORNEY

DIVALENT EUROPIUM-ACTIVATED BARIUM-MAGNESIUM PYROSILICATE

BACKGROUND OF THE INVENTION

This invention relates to the luminescence due to divalent europium activation of the compound $BaMg_2Si_2O_7$. In the ternary systems ($BaO-MgO-SiO_2$; $SrO-MgO-SiO_2$; $CaO-MgO-SiO_2$) only the first system possesses a compound such as the above-mentioned one with a (1-2-2) stoichiometry; the ratio being the moles of BaO to MgO to $SiO_2$. Since no such compound exists in the latter two systems, only limited substitution of strontium and/or calcium for barium may be realized. The effect of such substitutions on the luminescence of $(Ba_{1-x-y-z}Sr_xCa_y) Mg_2Si_2O_7:Eu_z^{2+}$ have been shown to be detrimental. While this formulation represents the approximate composition of the respective compounds in a given phosphor, which can be identified by X-ray diffraction and spectral energy distribution curves, an actual composition may vary from the formula as written without lying outside the scope of the invention.

DESCRIPTION OF PRIOR ART

Klasens, Hoekstra, and Cox: J. Electrochem. Soc. 104, 93 (1957), conducted an extensive investigation on the fluorescence of the ternary silicate compounds including the systems $BaO-MgO-SiO_2$; $SrO-MgO-SiO_2$; and $CaO-MgO-SiO_2$. Aside from Pb, they reported trying many of the other usual activators, such as Mn, Tl, Bi, Sb and Sn in the ternary compounds. Although some did show weak fluorescence, none of them led to phosphors of any appreciable efficiency.

SUMMARY OF THE INVENTION

The phosphor, $BaMg_2Si_2O_7: Eu_{0.04}^{2+}$, (FIG. 2) has a spectral energy distribution curve which peaks at 400 nm. and has a very narrow emission band. The width of the emission band at half-height being 25 nm. This combination of a very narrow emission band and the emission peak falling near the violet edge of the visible spectrum which is directly visible to the eye is extremely desirable for certain photocopy applications.

Even relatively small additions of calcium (10 mole percent) produce two phases and the emission spectra show a doublet, one band at 400 nm. and a new band at 445 nm. When large quantities (up to 30 mole percent calcium) are used, the band at 400 nm. continues to diminish, while the band at 445 nm. increases. At higher calcium concentrations the intensity of both emission bands is reduced.

Strontium, however, may be substituted in quantities less than 30 mole percent for barium in $BaMg_2Si_2O_7$ with a single phase resulting. However, the intensity of the single emission band, which remains at approximately 400 nm., falls off with increasing strontium concentration. For strontium concentrations of 30 mole percent and beyond, a second emission band at 465 nm. appears, and becomes more pronounced.

Data illustrating the phenomena described above are given in Table 1.

TABLE 1
[Fluorescence Data on a few Selected Compositions]

| Composition | Emission peaks for 2537A. excitation (nm.) | Relative intensity of the 400 nm. band |
|---|---|---|
| $Ba_{0.98}Mg_2Si_2O_7:Eu_{0.02}^{2+}$ | 400 | 100 |
| $(Ba_{0.88}Ca_{0.10})Mg_2Si_2O_7:Eu_{0.02}^{2+}$ | 400, 445 | 66 |
| $(Ba_{0.78}Sr_{0.20})Mg_2Si_2O_7:Eu_{0.02}^{2+}$ | 400 | 82 |
| $(Ba_{0.68}Sr_{0.30})Mg_2Si_2O_7:Eu_{0.02}^{2+}$ | 400, 465 | 39 |

Assays were run on both the basic magnesium carbonate and the silicic acid in order that sorbed water could be compensated for in formulating the blends. Activator concentrations between 0.005 and 0.10 atom fraction europium were all found to produce efficient phosphors. A value of 0.04 was commonly employed.

DESCRIPTION OF THE PREFERRED EMBODIMENT

Figure 1:
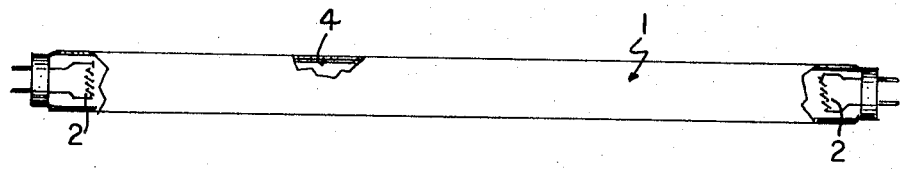
FIG. 1 is an arc discharge lamp, partially broken away, containing the phosphor in accordance with this invention.
Figure 2:
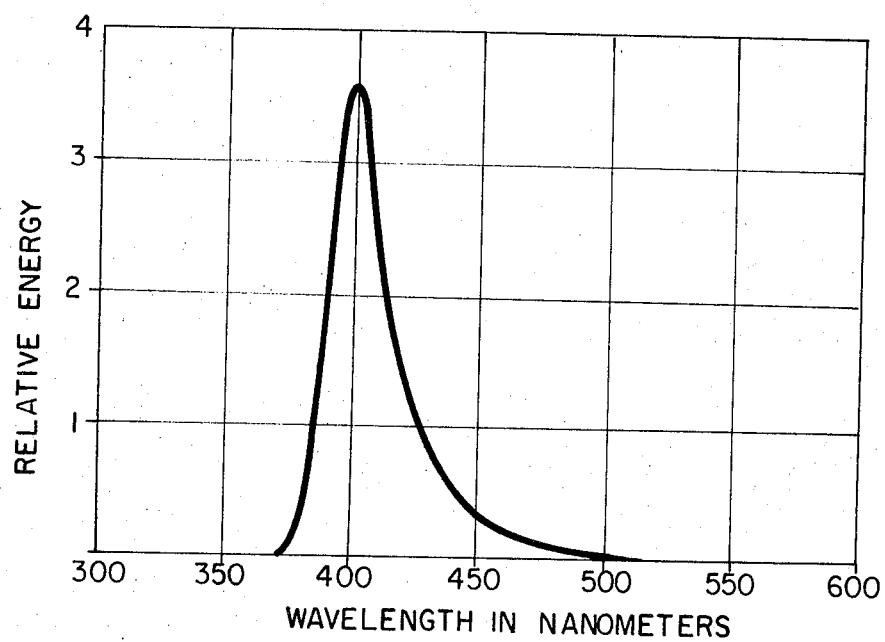
FIG. 2 is an SED curve of a $BaMg_2Si_2O_7:Eu^{2+}$ phosphor of this invention.

As shown in FIG. 1 of the drawing, one embodiment of an arc discharge lamp in accordance with this invention comprises a glass envelope 1 and electrodes 2 at each end of the lamp. Within envelope 1 is a fill which includes mercury. On the inner surface of envelope 1, there is a coating 4 of a barium-magnesium europium activated pyrosilicate phosphor. When an arc is struck between the electrodes, the resultant ultraviolet radiation impinges onto phosphor 4 and excites it to fluorescence. The resultant peak emission is in the 400 nm. region of the spectrum.

Starting mixtures were prepared by dry blending the appropriate proportions of the raw materials in a Mixer/Mill for 15 minutes. The addition of a few glass beads to the raw blend greatly facilitates the mixing process.

The blended mixtures were prefired in alumina boats at 600° C. in air. This firing initiates the decomposition of the alkaline earth carbonates and reaction with the ammonium chloride flux.

The prefired samples are then placed in a silica tube which is flushed with nitrogen for 5 minutes and then inserted into the furnace and fired at 1200° C. The gas flow is then adjusted to give a resultant mixture of 4 parts nitrogen to 1 part hydrogen. Firing times of 2 to 12 hours and temperatures ranging between 1,100° and 1,300° C. were used at various times, the routine combination being 4 hours at 1,200° C. After firing the silica tube was removed from the furnace and the samples allowed to cool to room temperature in the flowing hydrogen-nitrogen atmosphere.

The ammonium chloride is employed as a flux to enhance the crystallinity of the fired product and any residual chloride is removed after the firing by a water wash.

The following examples are offered as specific embodiments of my invention.

EXAMPLE I $BaMg_2Si_2O_7:Eu_{0.04}^{2+}$

| Material | Moles | Grams |
|---|---|---|
| $BaCO_3$ | 1.00 | 5.921 |
| $3MgCO_3 \cdot Mg(OH)_2 \cdot 3H_2O$ | 0.50 | 5.481 |
| $SiO_2$ | 2.00 | 3.605 |
| $Eu_2O_3$ | 0.02 | 0.211 |
| $NH_4Cl$ | 0.40 | 0.642 |

EXAMPLE II $(Ba_{0.88}Ca_{0.10})Mg_2Si_2O_7:Eu_{0.02}^{2+}$

| Material | Moles | Grams |
|---|---|---|
| $BaCO_3$ | 0.88 | 5.210 |
| $CaCO_3$ | 0.10 | 0.300 |
| $3MgCO_3 \cdot Mg(OH)_2 \cdot 3H_2O$ | 0.50 | 5.481 |
| $SiO_2$ | 2.00 | 3.605 |
| $Eu_2O_3$ | 0.01 | 0.106 |
| $NH_4Cl$ | 0.40 | 0.642 |

EXAMPLE III $(Ba_{0.78}Sr_{0.20})Mg_2Si_2O_7:Eu_{0.02}^{2+}$

| Material | Moles | Grams |
|---|---|---|
| $BaCO_3$ | 0.78 | 4.618 |

| | | |
|---|---|---|
| SrCO$_3$ | 0.20 | 0.886 |
| 3MgCO$_3$·Mg(OH)$_2$·3H$_2$O | 0.50 | 5.481 |
| SiO$_2$ | 2.00 | 3.605 |
| Eu$_2$O$_3$ | 0.01 | 0.106 |
| NH$_4$Cl | 0.40 | 0.642 |

EXAMPLE IV

| | (Ba$_{0.68}$Sr$_{0.30}$)Mg$_2$Si$_2$O$_7$:Eu$^{2+}_{0.02}$ | |
|---|---|---|
| Material | Moles | Grams |
| BaCO$_3$ | 0.68 | 4.026 |
| SrCO$_3$ | 0.30 | 1.329 |
| 3MgCO$_3$·Mg(OH)$_2$·3H$_2$O | 0.50 | 5.481 |
| SiO$_2$ | 2.00 | 3.605 |
| Eu$_2$O$_3$ | 0.01 | 0.106 |
| NH$_4$Cl | 0.40 | 0.642 |

Examples II and IV above do not yield single phase phosphors of the formulas as written. Various changes in the details and materials which have been described herein may be made by those skilled in the art within the principle and scope of the invention as expressed in the appended claims.

I claim:

1. A fluorescent material consisting essentially of barium magnesium pyrosilicate activated by europium in sufficient quantities to produce luminescence, wherein the ratio of barium to magnesium is about one to two.

2. The material according to claim 1 wherein the formula is BaMg$_2$Si$_2$O$_7$:Eu$_{0.005}$ to $_{0.10}$.

3. The material according to claim 2 wherein strontium is substituted for the barium in quantities less than 30 mole percent.

4. The material according to claim 2 wherein the europium is divalent.

5. A fluorescent lamp including a glass envelope containing mercury having electrodes disposed on the ends thereof and a coating of a fluorescent material consisting essentially of barium magnesium pyrosilicate activated by europium in sufficient quantities to produce luminescence, wherein the ratio of barium to magnesium is about one to two.

6. The lamp according to claim 5 wherein the formula is BaMg$_2$Si$_2$O$_7$:Eu$_{0.005}$ to $_{0.10}$.

7. The lamp according to claim 6 wherein strontium is substituted for the barium in quantities less than 30 mole percent.

8. The lamp according to claim 6 wherein the europium is divalent.

* * * * *